Patented June 26, 1923.

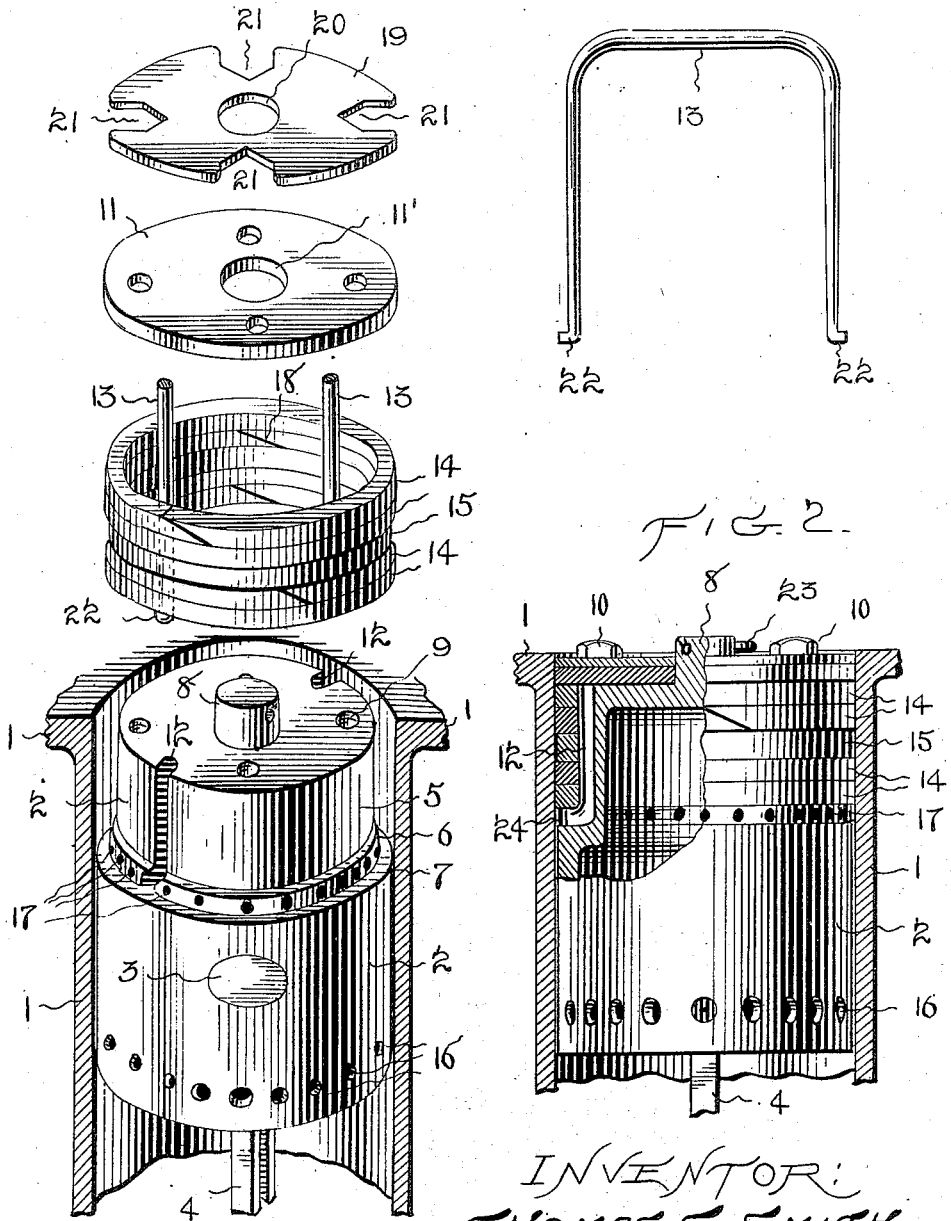

1,460,041

UNITED STATES PATENT OFFICE.

THOMAS C. SMITH, OF BRIDGEPORT, CONNECTICUT, ASSIGNOR, BY DIRECT AND MESNE ASSIGNMENTS, OF ONE-THIRD TO GEORGE P. SMITH AND ROGER E. DICKINSON, BOTH OF NEW HAVEN, CONNECTICUT, AND ONE-THIRD TO ALBERT C. MENGES AND ROBERT L. CARR, BOTH OF MEMPHIS, TENNESSEE.

PISTON.

Application filed September 3, 1921. Serial No. 498,390.

*To all whom it may concern:*

Be it known that I, THOMAS C. SMITH, a citizen of the United States, and resident of Bridgeport, in the county of Fairfield and State of Connecticut, have invented certain new and useful Improvements in and Relating to Pistons, of which the following is a specification.

This invention relates to pistons, more particularly to the pistons of internal combustion engines, and primarily, the invention is designed to provide an improved system employing means whereby removal and replacement of the piston packing rings is facilitated and which system and means are applicable generally to existing types of engines. In common practice, the piston of an internal combustion engine is a hollow body, sliding within the piston cylinder, and the piston or packing rings carried on the piston only are in frictional contact with the inner walls of the cylinder. These rings usually are split, iron or steel rings and are sprung over the piston and are seated in circumferential grooves cut in the outer surface of the piston. Considerable difficulty is experienced in removing and replacing the rings so arranged, chiefly because the piston must be disconnected and taken out of the cylinder to obtain access to the rings.

It has been proposed heretofore, to provide means for obviating some of the disadvantages which exist with the common form of piston construction and arrangement, and the proposed improvements consist in seating the packing rings on a reduced end of the piston and securing said rings in place by means of a piston head or cap-plate, which latter is detachably secured to the closed end of the piston and over said rings so as to hold them in place. Now, in order to remove the rings, in all previous known instances, the piston or at least all of that part of the piston which carries the rings, must be taken out of the cylinder and before this can be done the piston must be disconnected from the piston-rod. The operation of disconnecting this rod also involves disconnecting or removal of the bearings and adjacent parts or members and in re-assembling and again connecting these parts or members, considerable skill must be exercised in their re-adjustment.

In accordance with the present invention, the improved system, amongst other advantages, provides means whereby the piston packing rings may readily be removed and replaced while the piston is in one of its normal positions, still within the cylinder and this removal can be effected without disconnecting the piston or removing any parts or members, except the engine-head or plate and those means which are directly employed to retain the packing rings in place.

The improved system and means employed therewith will be hereafter fully described with reference to the accompanying drawings and the several novel features of the invention will be defined in the appended claims. In said drawings:—

Figure 1 is a projected elevation showing the parts of the piston disassembled,

Figure 2 is an elevation partly in section, and

Figure 3 illustrates a convenient tool which is employed with the improved system.

In the embodiment of the invention illustrated in the aforesaid drawings, the piston cylinder 1 is of a common form and the hollow piston body 2 within the cylinder, out of frictional contact with the walls thereof, is connected, in the usual manner, by means of the wrist-pin 3 and piston rod or pitman 4 to the engine crank-shaft (not shown). With the present invention, the construction of the piston is however modified to the extent that it has the reduced end 5 and the shouldered portions 6—7 and the boss 8 projecting from the closed head of the piston. Also, threaded holes 9 are provided in the head of the piston to receive bolts 10, by means of which the piston ring retaining and detachable head or plate 11, having hole 11' fitting boss 8, is secured to the piston. Vertical or longitudinal grooves or slots 12, diametrically opposite each other, are cut in the sides of the reduced end 5, to receive a suitable ring extracting tool such as 13, by means of which tool, the piston packing rings 14 and the spacing ring 15 can be taken off the piston and withdrawn out of the piston cylinder. Perforations 16 and 17 are provided in the piston respectively at the bottom thereof and in the shouldered portion 6, to ensure proper distribution of the lubricant for the piston. The piston packing rings 14 are expanded so as to tightly fit on the reduced portion 5 of the piston and frictionally engage the side walls of the cylinder thereby eliminating possible escape of gas under pressure, and further, to render impossible the formation of a passage through which gas may escape, even should the spaces 18, between the ends of the piston rings, come into alignment with each other, as they may, the intervening space ring 15 is provided for the purpose of effectually closing any passage which might be formed.

In assembling the various parts of the improved piston, the rings 14 are dropped in pairs on the reduced end 5, so that the lowermost ring rests upon the shouldered portion 6. The spacing ring 15 is located between the pairs of piston packing rings and all the rings are held down by means of the head or plate 11 which is tightly secured in place by means of the bolts 10. The piston, when in use, being subjected to considerable vibration, the said bolts 10 may work loose under ordinary conditions and thus become a serious defect. To ensure against this happening, locking plate 19, having hole 20 and notches 21 fitting respectively over the boss 8 and the bolts 10, is employed and secured by a cotter-pin 22 passing through the boss 8. Engagement of the bolt heads in the notches 21 will effectually prevent said bolts working loose, and besides performing its functions as a locking means, said plate will serve to collect the usual deposit of carbon which may be more easily removed from the plate when the latter is taken out to be cleaned, than when the carbon is allowed to collect on the head of the piston.

When it is required to take out the piston rings, the piston is brought into a state of rest while it is in its highest position but still within the cylinder. The cover plate 19 and piston head 11 are then taken out and the legs of the extracting tool 13 are inserted into the grooves or slots 12 to such a depth that the hooked ends of the tool will spring into engagement under the lowermost ring 14. The rings can then be withdrawn from the cylinder with facility.

It should be noted, an annular space 24 is formed between the bottom of the lowermost ring 14 and the shouldered portion 7 of the piston and this space, with the perforations 17 ensures the proper distribution of the lubricant for the piston.

Modifications may be made without departing from the spirit of the present invention and it is therefore intended to cover any modification which come fairly within the terms of the appended claims.

I claim:—

1. In a device as described, a piston having a reduced portion upon which a piston packing ring is seated and a longitudinal slot in said reduced portion adapted to receive a tool employed for removing said ring.

2. In a system as described, the employment of a piston having a reduced portion, piston packing rings seated on said reduced portion, and longitudinal grooves in said reduced portion adapted to receive a tool so as to permit engagement thereof with said packing rings.

3. In a system as described, the employment of means comprising a cylinder, a piston within said cylinder, said piston having a reduced end, packing rings seated on said reduced end, a detachable retaining head for said rings, and slots in said reduced end adapted to receive a tool and permit its engagement with said rings and withdrawal of said rings from said cylinder by means of said tool.

4. In a system as described, the employment of means comprising a piston cylinder, a piston within said cylinder having a reduced end, piston packing rings seated on said reduced end, grooves on opposite sides in said reduced end adapted to receive a tool by means of which said rings are withdrawn from said cylinder, a detachable head or plate held by bolts, covering said grooves and retaining said rings in place, and a locking plate for said bolts.

5. In a system as described, the employment of means comprising a cylinder having therein a piston of varying diameter forming a reduced end and a shouldered part providing a seat for piston rings placed thereon and said shouldered part being perforated for the distribution of lubricant supplied to said rings.

6. In a device as described, the combination of a cylinder, a piston within said cylinder, said piston having a reduced end and a shouldered portion upon which packing rings and an intervening spacing ring are seated, grooves in the sides of said reduced end adapted to receive a tool wherewith said rings are withdrawn from said cylinder, a detachable retaining head or plate for said rings, bolts for securing said head or plate to the piston and a locking plate for said bolts covering said head or plate.

7. In a device as described, the combination of a cylinder, a piston with piston rings thereon located within said cylinder, and means permitting and effecting the removal of said rings from said cylinder without taking out or disconnecting said piston, said means comprising a detachable piston head, grooves in said piston and a tool having hooked ends capable of being received in said grooves to engage said rings and effect their withdrawal from said cylinder.

Signed at New Haven in the county of New Haven and State of Connecticut this 26th day of August A. D. 1921.

THOMAS C. SMITH.